United States Patent
Takahashi et al.

(10) Patent No.: US 7,938,100 B2
(45) Date of Patent: May 10, 2011

(54) VARIABLE VALVE DEVICE FOR ENGINE

(75) Inventors: Seigo Takahashi, Shizuoka (JP);
Hidetoshi Ishigami, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 369 days.

(21) Appl. No.: 12/353,411

(22) Filed: Jan. 14, 2009

(65) Prior Publication Data

US 2009/0178646 A1    Jul. 16, 2009

(30) Foreign Application Priority Data

Jan. 15, 2008 (JP) ................. 2008-005202

(51) Int. Cl.
*F02D 13/02* (2006.01)
*F02D 13/00* (2006.01)
(52) U.S. Cl. .................... 123/346; 123/90.15
(58) Field of Classification Search .......... 123/345, 123/346, 347, 348, 90.15, 90.16, 198 D
See application file for complete search history.

(56) References Cited

U.S. PATENT DOCUMENTS 7,293,537 B2 * 11/2007 Arai et al. ............ 123/90.16

FOREIGN PATENT DOCUMENTS

| EP | 1 669 560 A1 | 6/2006 |
| EP | 1 741 909 A1 | 1/2007 |
| JP | 2003-041976 A | 2/2003 |
| JP | 2004-48875 A | 2/2004 |
| JP | 2007-37336 A | 2/2007 |

OTHER PUBLICATIONS

Official Communication issued in corresponding European Patent Application No. 09000453.2, mailed on Sep. 29, 2010.

* cited by examiner

*Primary Examiner* — Mahmoud Gimie
(74) *Attorney, Agent, or Firm* — Keating & Bennett, LLP

(57) ABSTRACT

A variable valve device, which is capable of controlling a fuel injection amount or the like if a control shaft sensor has a failure, uses a brushless DC motor to rotate the control shaft, detects the rotation angle of the motor using its magnetic pole sensors, and calculates an estimated rotation angle of the control shaft based on the rotation angle. The variable valve device further determines that the control shaft sensor has a failure if the difference between the actual rotation angle of the control shaft detected by the control shaft sensor and the calculated estimated rotation angle exceeds a prescribed value and controls the fuel injection amount, fuel injection timing and ignition timing of the engine based on the calculated estimated rotation angle.

16 Claims, 16 Drawing Sheets

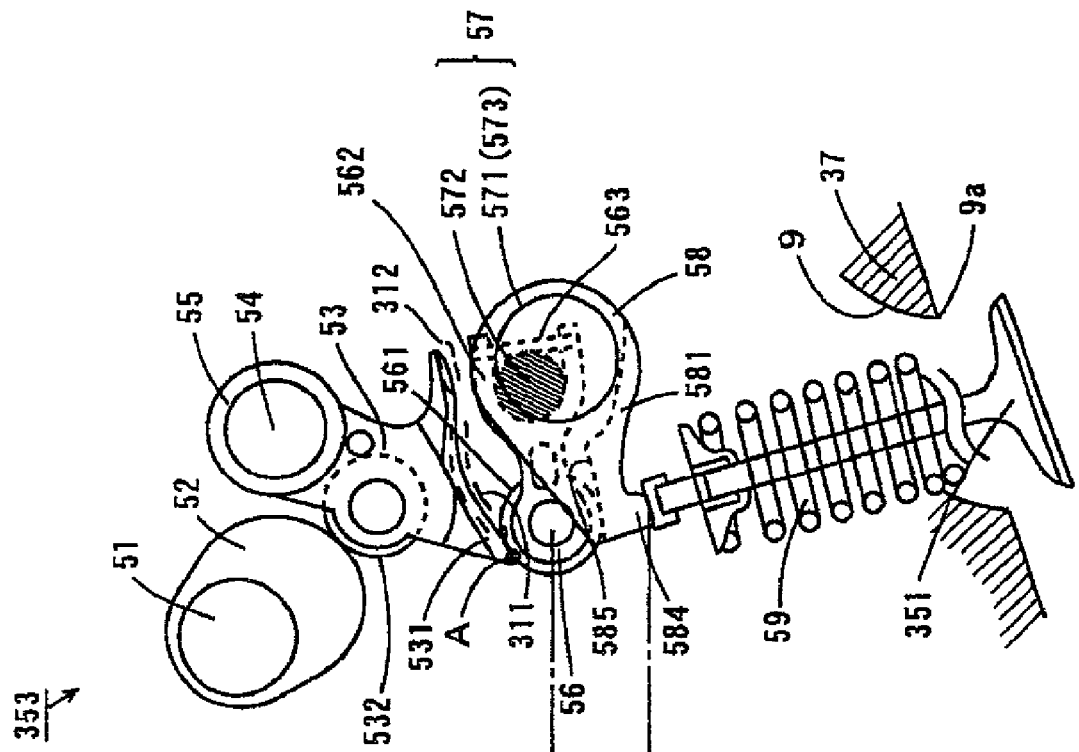
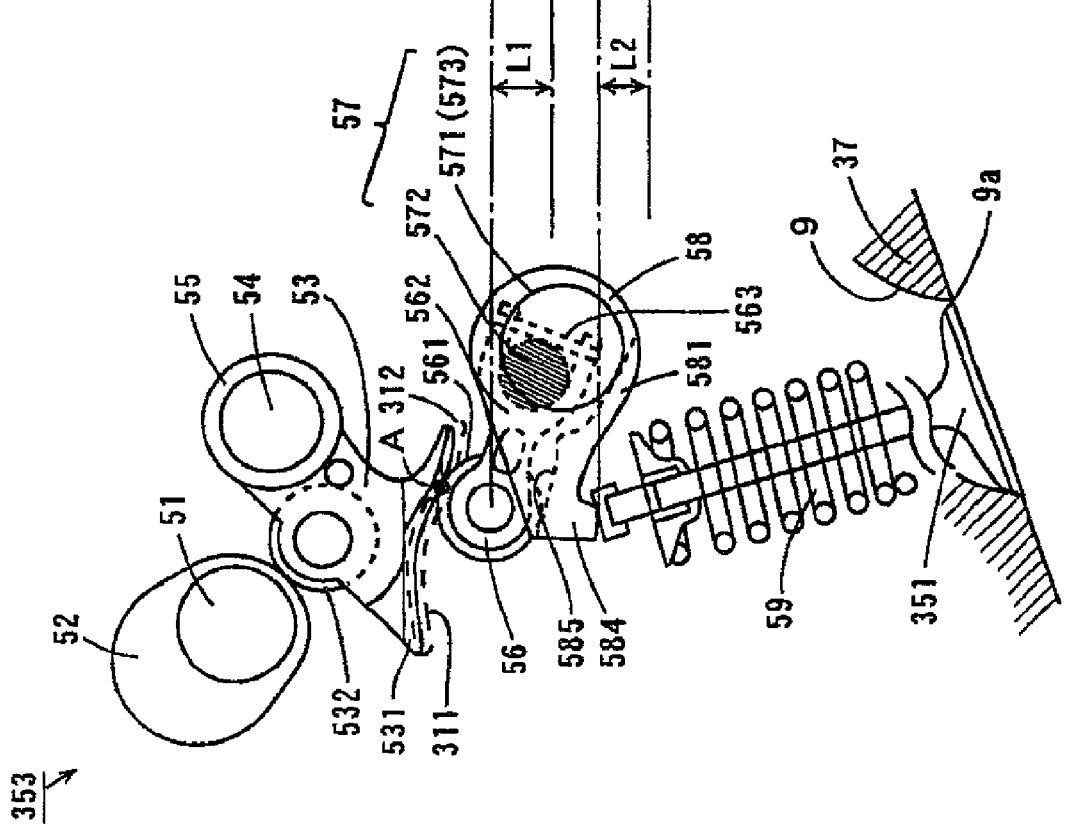

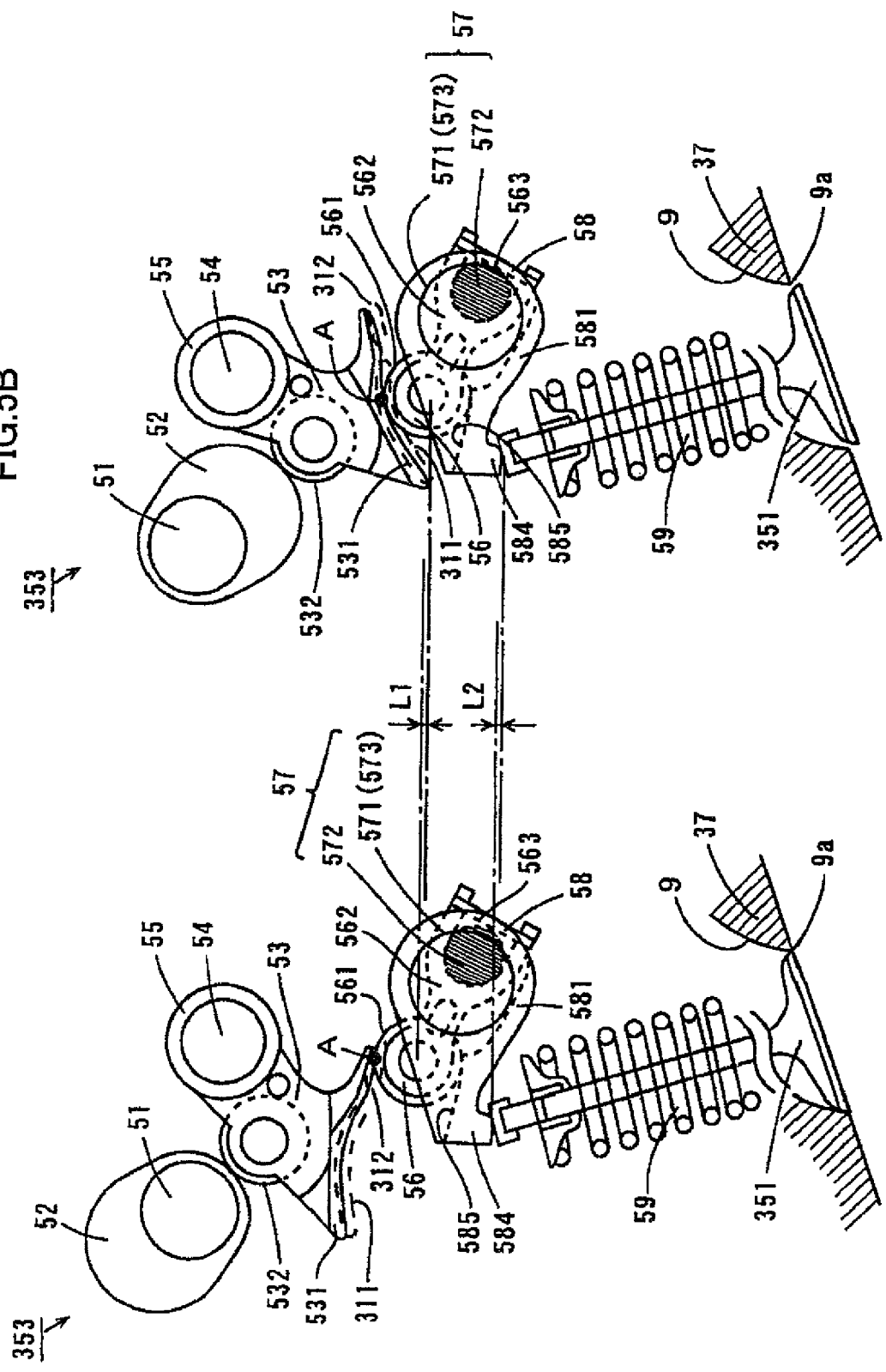

VARIABLE VALVE DEVICE FOR ENGINE

BACKGROUND OF THE INVENTION

1. Field of the Invention

The present invention relates to a variable valve device and more specifically to a variable valve device used to change the displacement (generally called "lift degree") of an intake valve in an engine.

2. Description of the Background Art

JP 2003-41976 A discloses a device that detects the operation angle of a control shaft in a variable valve mechanism that continuously changes the valve lift degree and the valve operation angle of an intake valve in an internal combustion engine in response to the operation angle of the control shaft. The device includes an operation angle sensor that generates an output in response to the operation angle of the control shaft, such that an intake air amount is estimated based on the operation angle detected based on the output.

However, when the operation angle sensor (that corresponds to the "control shaft sensor" according to the present invention) has a failure, the intake air amount can no longer be estimated, so that the fuel injection amount or the like cannot be controlled.

In order to solve this problem, there is a method of detecting an intake air amount using an airflow sensor in an intake pipe. However, when the engine speed increases, the overlap state in which the intake valve and the exhaust valve are both open is prolonged, and exhaust gas is discharged into the intake pipe through the intake valve, (in other words, spitback is caused) which lowers the detection precision for the intake air amount. Motorcycles in particular are driven at high engine speed more often than automobiles and accordingly, in motorcycles, this problem cannot be ignored.

In addition, a motorcycle vibrates more than an automobile and an airflow sensor could be more prone to failures depending on where the sensor is provided. A motorcycle has a limited installation space as compared to the automobile, and therefore it is difficult to secure a location to provide such an airflow sensor.

A pressure sensor may be provided in an intake pipe and the difference in the intake pressure may be detected to estimate the intake air amount. However, there is little difference in the intake pressure in motorcycles without throttle valves, and this method cannot be applied to this kind of motorcycle. Furthermore, in a motorcycle with a throttle valve, the difference in the intake valve changes as the valve lift degree changes, and therefore it is difficult to accurately estimate the intake air amount.

Two control shaft sensors may be provided to a control shaft, but this increases the manufacturing cost. If two sensors are provided, additional control to determine which sensor has a failure must be carried out.

SUMMARY OF THE INVENTION

Preferred embodiments of the present invention provide a variable valve device capable of controlling a fuel injection amount or the like in the event of a control shaft sensor failure.

A variable device according to a preferred embodiment of the present invention is a variable valve device arranged to change the displacement of an intake valve in an engine and includes a control shaft arranged to change the displacement of the intake valve by operating a mechanism arranged to drive the intake valve, a motor arranged to rotate the control shaft, a motor driver arranged to drive the motor according to the speed of the engine and the opening degree of the accelerator, a control shaft sensor arranged to detect the actual rotation angle of the control shaft, a control shaft rotation angle estimator arranged to calculate a rotation angle of the motor and to calculate an estimated rotation angle of the control shaft based on the calculated rotation angle, a control shaft sensor failure detector arranged to determine whether or not the control shaft sensor is operating normally, and a combustion state adjuster arranged to control at least one of the fuel injection amount, fuel injection timing, and ignition timing of the engine based on the actual rotation angle detected by the control shaft sensor if the control shaft sensor failure detector determines that the control shaft sensor is operating normally and based on the estimated rotation angle calculated by the control shaft rotation angle estimator if the control shaft sensor failure detector determined that the control shaft sensor is not operating normally.

According to a preferred embodiment of the present invention, when it is determined that the control shaft sensor is not operating normally, the rotation angle of the motor that rotates the control shaft is calculated and an estimated rotation angle of the control shaft is calculated based on the rotation angle, and therefore if the control shaft sensor has a failure, a fuel injection amount or the like can be controlled based on the estimated rotation angle.

The motor may be a brushless DC motor having a plurality of magnetic pole sensors, for example. The control shaft rotation angle estimator calculates the rotation angle of the brushless DC motor based on the output signals of the magnetic pole sensors and calculates an estimated rotation angle of the control shaft based on the calculated rotation angle.

In this case, the rotation angle is calculated using the magnetic pole sensors in the brushless DC motor and therefore only a small installation space is necessary.

The control shaft sensor failure detector may include a comparator arranged to compare the actual rotation angle detected by the control shaft sensor with the estimated rotation angle calculated by the control shaft rotation angle estimator, and a determiner arranged to determine that the control shaft sensor is operating normally if the difference between the actual rotation angle and the estimated rotation angle is not within a prescribed range and that the control shaft sensor is not operating normally if the difference between the actual rotation angle and the estimated rotation angle is not within the prescribed range based on the result of the comparison by the comparator.

In this way, additional large hardware is not necessary in order to detect a failure in the control shaft sensor.

The variable valve device may further include an engine speed determiner arranged to determine whether or not the speed of the engine is lower than a prescribed value if the control shaft sensor failure detector determines that the control shaft sensor is not operating normally, and a displacement reducer arranged to reduce the displacement if the engine speed determiner determines that the speed of the engine is higher than a prescribed value.

In this case, the speed of the engine is gradually reduced, and a speed of a vehicle gradually slows accordingly, so that the rider or driver can be aware of a failure caused in the control shaft sensor.

The variable valve device may further include a target displacement calculator arranged to calculate a target lift degree for the intake valve according to the speed of the engine and the opening degree of the accelerator. The displacement reducer compares a deceleration of the target displacement calculated by the target displacement calculator with a prescribed deceleration and reduces the displacement by the greater deceleration.

In this way, if the deceleration of the target displacement is greater than the prescribed deceleration, the speed of the engine can quickly be lowered according to the rider's intention.

The variable valve device may further include a maximum displacement saver arranged to save the displacement reduced by the displacement reducer as maximum displacement. The motor driver drives the motor so that the displacement exceeds the maximum displacement stored by the maximum displacement saver if the engine speed determiner determines that the speed of the engine is lower than a prescribed value.

In this way, driving can be continued at the lowered speed.

The variable valve device may further include a deceleration determiner arranged to determine whether a deceleration of the speed of the engine is smaller than a prescribed value, and a deceleration relaxer arranged to reduce the displacement to be reduced by the displacement reducer if the deceleration determiner determines that the deceleration is greater than the prescribed value.

In this way, the speed of the engine can gradually be lowered and a speed of a vehicle can gradually be slower accordingly.

Other features, elements, steps, characteristics and advantages of the present invention will become more apparent from the following detailed description of preferred embodiments of the present invention with reference to the attached drawings.

BRIEF DESCRIPTION OF THE DRAWINGS

FIGS. 4A and 4B show the state of the intake valve driving mechanism having the variable valve device when the lift degree of the intake valve is maximized, FIG. 4A shows the fully open state and FIG. 4B shows the fully closed state.

FIGS. 5A and 5B show the state of the intake valve driving mechanism having the variable valve device when the lift degree of the intake valve is minimized, FIG. 5A shows the fully closed state and FIG. 5B shows the fully open state.

DETAILED DESCRIPTION OF THE PREFERRED EMBODIMENTS

Figure 1:
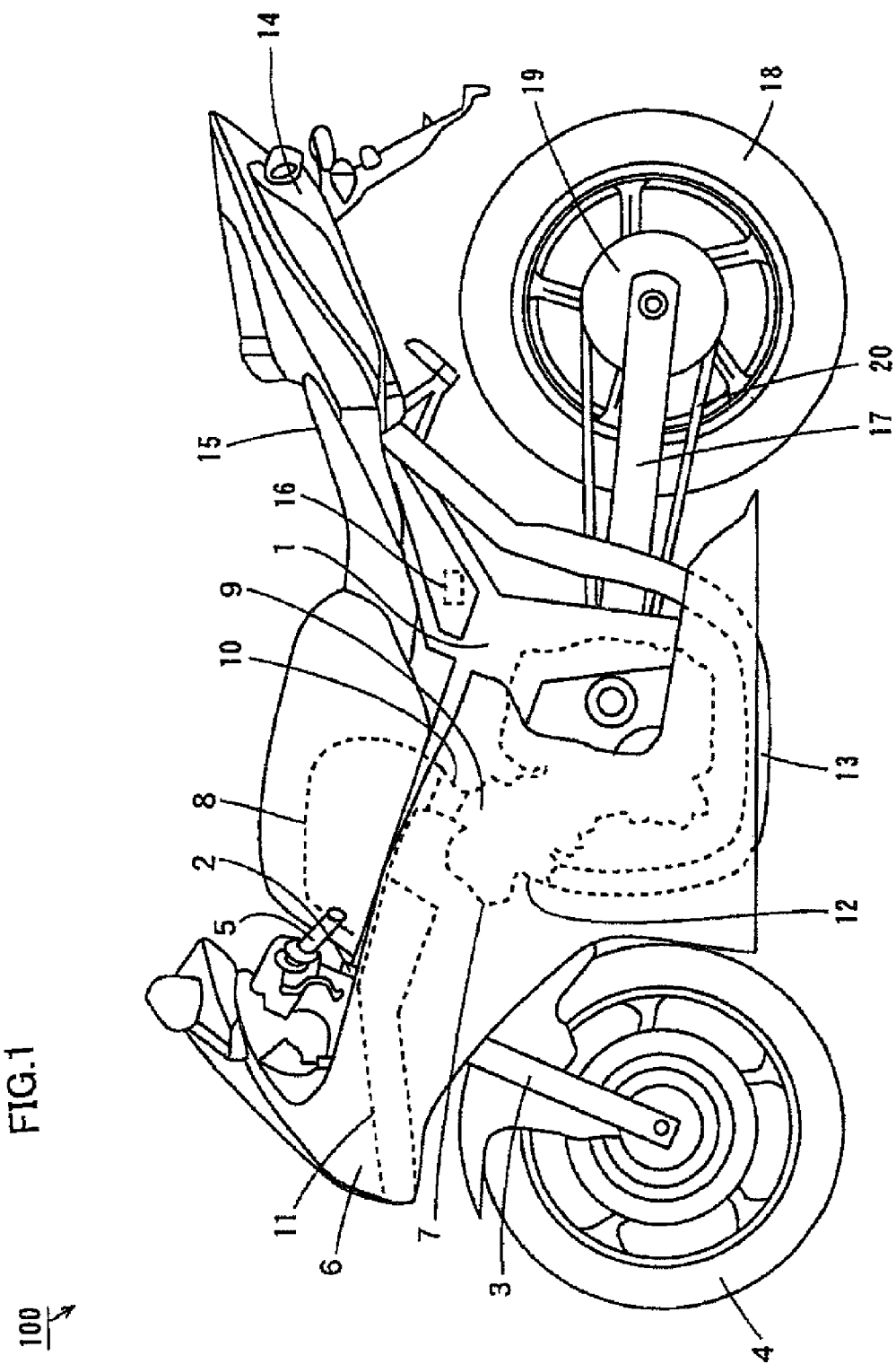
FIG. 1 is a side view of the general structure of a motorcycle including a variable valve device according to a preferred embodiment of the present invention.

Now, preferred embodiments of the present invention will be described in detail with reference to the accompanying drawings, in which the same or corresponding portions are denoted by the same reference characters, and their description will not be repeated.

(1) General Structure of Motorcycle

Referring to FIG. 1, the motorcycle 100 having a variable valve device according to a preferred embodiment of the present invention includes a mainframe 1. A head pipe 2 is provided at the front end of the main frame 1. A front fork 3 is provided pivotably at the head pipe 2. A front wheel 4 is rotatably supported at the lower end of the front fork 3. A handle 5 is attached at the upper end of the front fork 3.

A cowl 6 is arranged to cover the front and sides of the main frame 1. A four-cylinder engine (hereinafter simply as "engine") 7 is provided in the center of the main frame 1. An air cleaner box 8 is provided at the upper part of the engine 7. An intake pipe 10 is arranged so that the air cleaner box 8 and the intake port 9 of the engine 7 are connected.

An intake passage 11 to allow the air cleaner box 8 to communicate with the outside is at the front of the motorcycle 100 as it is covered with the cowl 6. One end of the intake passage 11 is open at the front of the cowl 6. Air from the outside of the motorcycle 100 is taken into the engine 7 through the intake passage 11, the air cleaner box 8 and the intake pipe 10.

One end of an exhaust pipe 13 is connected to the exhaust port 12 of the engine 7. The other end of the exhaust pipe 13 is connected to a muffler device 14. Exhaust gas generated by combustion of air-fuel mixture in the engine 7 is discharged to the outside through the exhaust pipe 13 and the muffler device 14.

A seat 15 is provided on the top of the engine 7. An ECU (Electronic Control Unit) 16 that controls the operation of various elements of the motorcycle 100 is provided under the seat 15. Details of the ECU 16 will later be described. A rear arm 17 is connected to the main frame 1 to extend to the back of the engine 7. A rear wheel 18 and a rear wheel driven sprocket 19 are rotatably held by the rear arm 17. The rear wheel driven sprocket 19 is provided with a chain 20. The power generated by the engine 7 is transmitted to the rear wheel driven sprocket 19 through the chain 20. In this way, the rear wheel 18 is rotated.

(2) Structure of Engine

Figure 2:
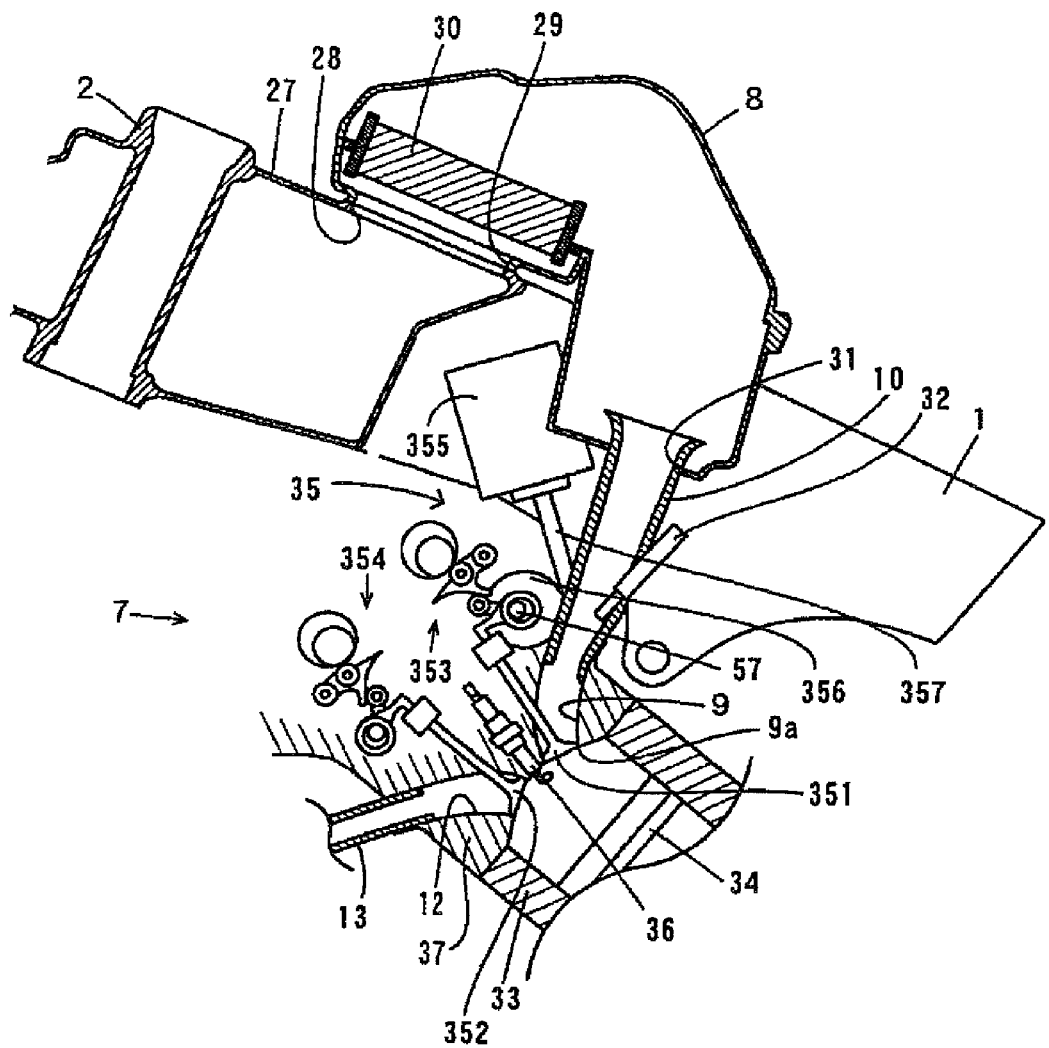
FIG. 2 is a longitudinal section of the periphery of the intake system and the engine of the motorcycle shown in FIG. 1.

Referring to FIG. 2, an air cleaner element 30 is provided in the vicinity of an opening 29 on one end in the air cleaner box 8. The air cleaner element 30 removes dust or the like included in air coming into the air cleaner box 8 from an air distribution box 27.

One end of the intake pipe 10 is connected to an opening 31 on the other end of the air cleaner box 8. The other end of the intake pipe 10 is connected to an opening on the upstream side of the intake port 9 of the engine 7. The intake pipe 10 is provided with an injector 32 used to supply fuel to the engine 7.

The engine 7 includes a cylinder 33, a piston 34, an ignition plug 36, a cylinder head 37, an intake valve 351, an exhaust valve 352, an intake valve driving mechanism 353, and an exhaust valve driving mechanism 354. The intake valve 351 and the exhaust valve 352 are driven by the intake valve driving mechanism 353 and the exhaust valve driving mechanism 354, respectively.

The engine 7 preferably has four cylinders 33, for example, although they are not shown. The piston 34, the ignition plug 36, the cylinder head 37, the intake valve 351, the exhaust valve 352, the intake valve driving mechanism 353, and the exhaust valve driving mechanism 354 are provided for each of the cylinders 33.

The intake valve driving mechanism 353 is provided with a variable valve device 35 used to continuously change the displacement (lift degree) of the intake valve 351 according to the engine speed of the engine 7 and the opening degree of the accelerator. The variable valve device 35 includes a control shaft 57, a control shaft sensor (not shown), and a motor 355. The intake valve driving mechanism 353 is coupled with the control shaft 57 and a worm wheel 356. The motor 355 has a rotation shaft 357 having a worm. The worm of the rotation shaft 357 and worm wheel 356 form a worm gear mechanism. The rotation force generated by the motor 355 is transmitted to the intake valve driving mechanism 353 through the rotation shaft 357, the worm wheel 356 and the control shaft 57. In this way, the state of the intake valve driving mechanism 353 is adjusted and the lift degree of the intake valve 351 is adjusted, details of which will be described in the following paragraphs.

In this way, air from the outside is taken into the cylinders 33 of the engine 7 through the air distribution box 27, the air cleaner box 8, and the intake pipe 10. Air taken into the cylinders 33 is mixed with fuel injected from the injector 32 and then ignited by the ignition plug 36. In this manner, power is generated by the engine 7.

(3) Structure of Variable Valve Device

Figure 3:
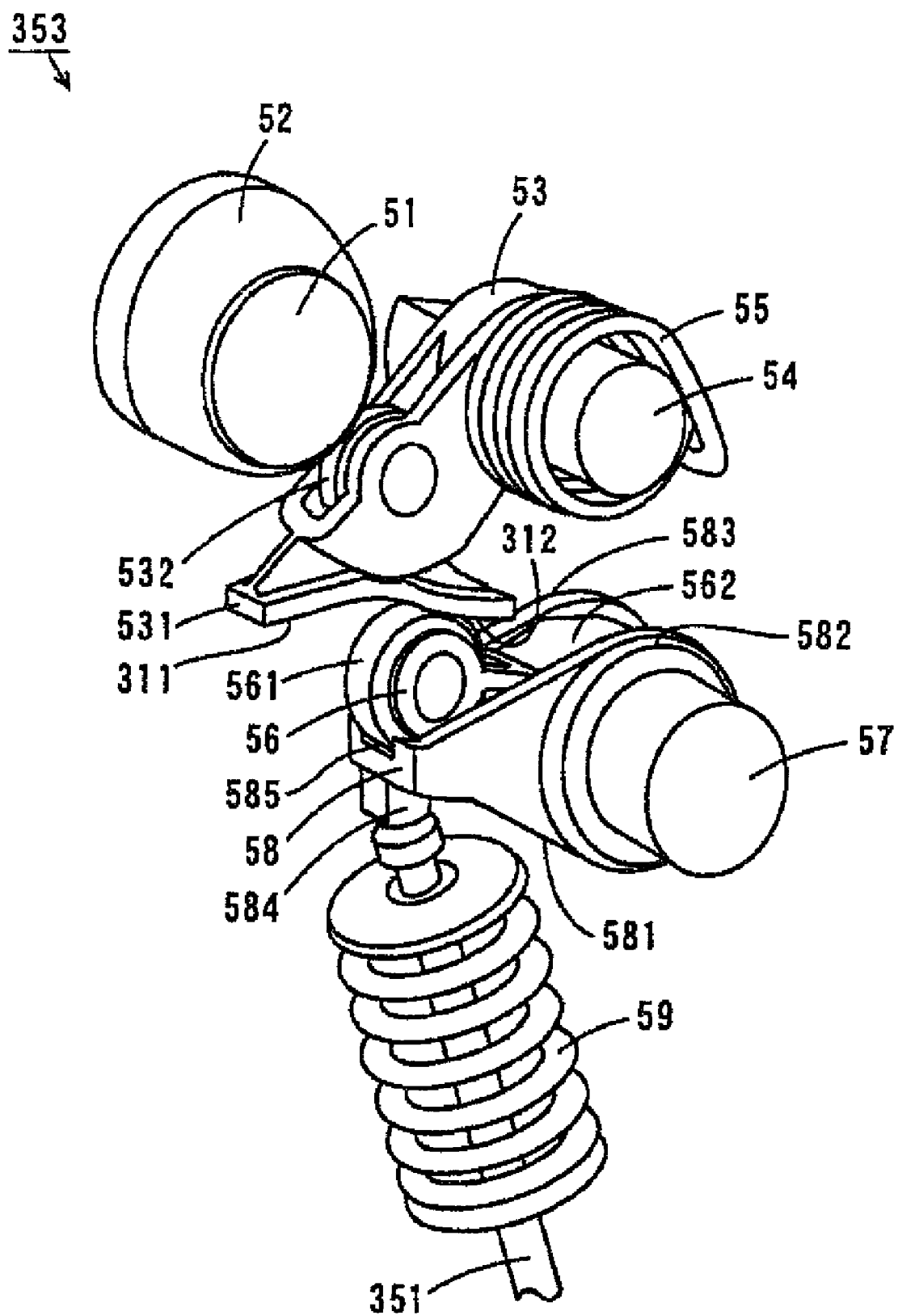
FIG. 3 is a perspective view of a portion of an intake valve driving mechanism having the variable valve device shown in FIG. 2.

Now, the variable valve device 35 will be described. FIG. 3 is a perspective view of the intake valve driving mechanism 353, FIGS. 4A, 4B, 5A and 5B are side views of the intake valve driving mechanism 353. Note that FIGS. 4A and 6A show the state of intake valve driving mechanism 353 when the lift degree of the intake valve 351 is minimized in one cycle, i.e., when the opening end 9a of the intake port 9 is closed by the intake valve 351. FIGS. 4B and 5B show the state of the intake valve driving mechanism 353 when the lift degree of the intake valve 351 is maximized in one cycle.

FIGS. 4A and 4B show the state of the intake valve driving mechanism 353 when the lift degree of the intake valve 351 is maximized by the variable valve device 35, and FIGS. 5A and 5B show the state of the intake valve driving mechanism 353 when the lift degree of the intake valve 351 is minimized by the variable valve device 35.

As shown in FIGS. 3, 4A, 4B, 5A and 5B, the intake valve driving mechanism 353 includes a rotation cam 52, a swing cam 53, a fixed shaft 54, a return spring 55, a control arm 56, and a rocker arm 58. The rotation cam 52 is fixed to a camshaft 51. A valve spring 59 is provided with the intake valve 351.

The intake valve driving mechanism 353 is provided for each intake valve 351. Therefore, according to the present preferred embodiment, the engine 7 includes intake valve driving mechanisms 353 as many as the intake valves 351.

The rotation cam 52 of each intake valve driving mechanism 353 is fixed to the one common camshaft 51.

A cam unit 531 is provided at one end of the swing cam 53. The cam unit 531 has a lift surface 311 and a base circular surface 312. A roller 532 is rotatably provided so as to rotate about the center of the swing cam 53. The other end of the swing cam 53 is rotatably provided at the fixed shaft 54. The fixed shaft 54 is fixed to the cylinder head 37 (FIG. 2).

The return spring 55 is attached to the cylinder head 37 and the swing cam 53. The return spring 55 energizes the swing cam 53 in one rotation direction around the fixed shaft 54. In this way, the outer circumferential surface of the roller 532 and the outer circumferential surface of the rotation cam 52 are abutted against each other.

A roller 561 is rotatably provided at one end of the control arm 56. A shaft holder 562 having an approximately U-shaped section is provided at the other end of the control arm 56. As shown in FIGS. 4A, 4B, 5A, and 5B, a restriction member 563 is provided at the front end of the shaft holder 562.

As shown in FIGS. 3, 4A, 4B, 5A, and 5B, the rocker arm 58 includes a bottom part 581 and side parts 582 and 583. A press-down part 584 projecting downwardly is provided at one end of the bottom part 581. The lower end of the press-down part 584 abuts against the upper end of intake valve 351. A roller receiving surface 585 is provided on the upper surface of the bottom part 581 on one end. The roller 561 of the control arm 56 is provided between the cam unit 531 of the swing cam 53 and the roller receiving surface 585 of the rocker arm 58.

The shaft holder 562 and the side parts 582 and 583 hold the control shaft 57. Note that according to the present preferred embodiment, one common control shaft 57 is held by the shaft holder 562 and the side parts 582 and 583 of each intake valve driving mechanism 353.

The valve spring 59 energizes the intake valve 351 upwardly in the axial direction. In this way, the upper end of the intake valve 351 and the lower end of the press-down part 584 are abutted against each other.

Figure 6:
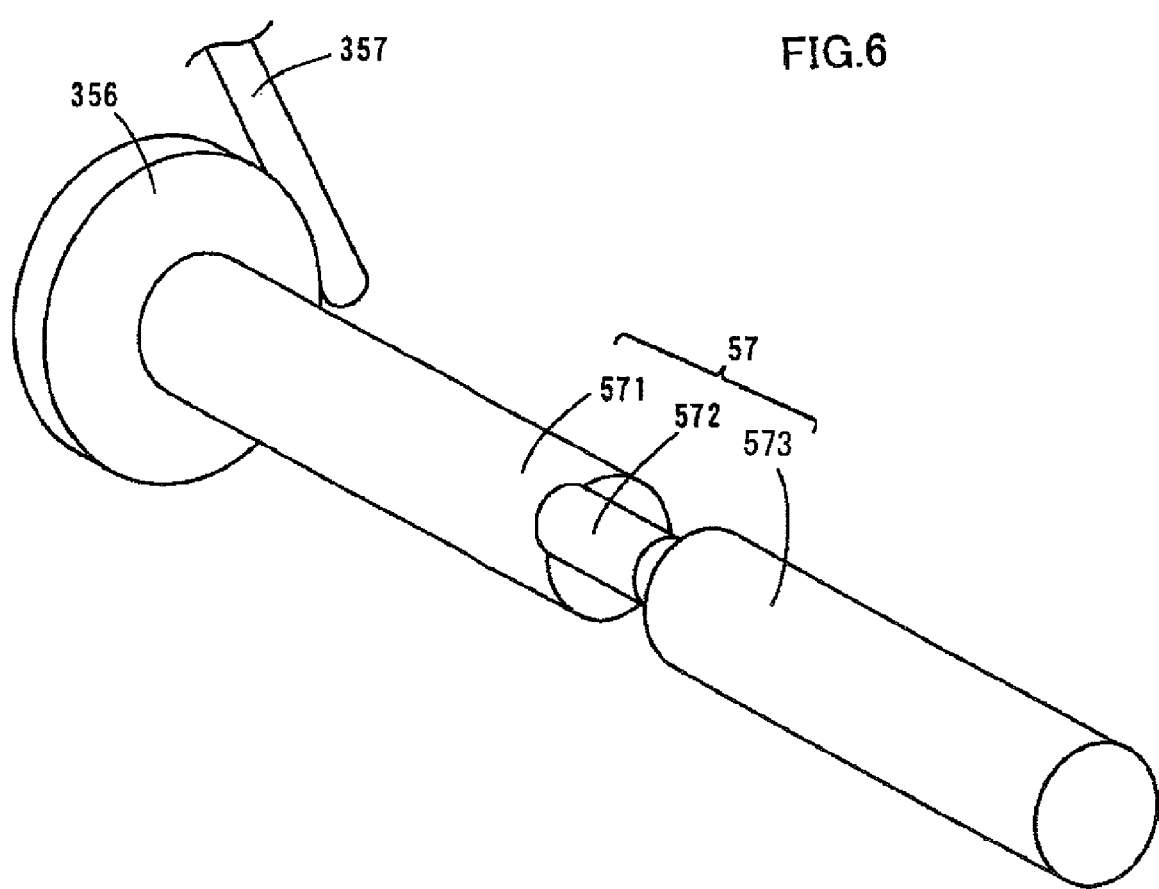
FIG. 6 is a perspective view of the general structure of the control shaft in FIGS. 2 and 3.

FIG. 6 is a schematic perspective view of the control shaft 57. As shown in FIG. 6, the control shaft 57 has large diameter parts 571, 573 and a small diameter part 572 that are integrally provided. The small diameter part 572 is provided eccentrically with respect to the axial center of the large diameter parts 571. The large diameter part 571 is rotatably held by the side parts 582 and 583 in FIGS. 3, 4A, 4B, 5A, and 5B, and the small diameter part 572 is rotatably held by the shaft holder 562 and the restriction member 563 in FIGS. 3, 4A, 4B, 5A, and 5B. The worm wheel 356 is fixed in a prescribed position of the large diameter part 571.

In this way, the rotation force of the crankshaft (not shown) of the engine 7 (FIG. 5) is transmitted to the camshaft 51 in FIGS. 3, 4A, 4B, 5A, and 5B through the chain (not shown). In this way, the rotation cam 52 rotates around the camshaft 51.

As the rotation cam 52 rotates, the swing cam 53 swings around the fixed shaft 54. The pivotal movement of the swing cam 53 allows the cam unit 531 of the swing cam 53 to swing. This moves the roller 561 up and down, so that the control arm 56 swings around the small diameter part 572.

As the control arm 56 swings, the rocker arm 58 swings around the large diameter parts 571 and 573. As the rocker arm 58 swings, the press-down part 584 moves up and down. This moves the intake valve 351 up and down. Consequently, the opening end 9a is opened/closed by the intake valve 351.

(4) Adjusting Lift Degree of Intake Valve

Now, a method of adjusting the lift degree of the intake valve 351 according to a preferred embodiment of the present invention will be described.

According to the present preferred embodiment, as the rotation shaft 357 (FIG. 6) of the motor 355 (FIG. 2) rotates, the worm wheel 356 (FIG. 6) rotates, and the control shaft 57 rotates. At the time, the small diameter part 572 (FIG. 6) moves on a circumference around the axial center of the large diameter parts 571, 573 (FIG. 6).

As shown in FIGS. 4A and 4B, when the small diameter part 572 is in its closest position to the cam shaft 51, the contact point A moves between the boundary of the lift surface 311 and the base circular surface 312 and the vicinity of the front end of the lift surface 311.

As shown in FIGS. 6A and 5B, when the small diameter part 572 is in its furthest position from the cam shaft 51, the contact point A moves between the vicinity of the front end of the base circular surface 312 and a prescribed position (approximate center of the cam unit 531) on the rear end side (on the side of the base circular surface 312) of the lift surface 311. More specifically, according to the present preferred embodiment, the moving range of the contact point A can be adjusted by changing the position of the small diameter part 572.

Here, the base circular surface 312 is defined on a circumference around the axial center of the fixed shaft 54. Therefore, when the contact point A moves on the base circular surface 312, the roller 561 is not moved up and down.

On the other hand, the lift surface 311 is arranged so that its distance from the axial center of the fixed shaft 54 increases toward the front end. Therefore, when the contact point A moves on the lift surface 311, the amount of how much the roller 561 is pressed downward by the cam unit 531 increases as the contact point A approaches the front end of the lift surface 311.

Therefore, as shown in FIGS. 4A and 4B, when the contact point A moves from the boundary between the lift surface 311 and the base circular surface 312 to the vicinity of the front end of the lift surface 311, the vertical moving distance L1 of the roller 561 is sufficiently large. This allows the vertical moving distance L2 of the press-down part 584 of the rocker arm 58 to be sufficiently large, so that the lift degree of the intake valve 351 increases.

On the other hand, as shown in FIG. 5, when the contact point A moves from the vicinity of the front end of the base circular surface 312 to a prescribed position on the rear end side of the lift surface 311, the vertical moving distance L1 of the roller 561 is reduced. The vertical moving distance L2 of the press-down part 584 decreases accordingly, so that the lift degree of the intake valve 351 is reduced.

As in the foregoing, according to the present preferred embodiment, the motor 355 (FIG. 2) is used to adjust the position of the small diameter part 572 and the moving range of the contact point A is adjusted, so that the lift degree of the intake valve 351 can be adjusted accordingly. More specifically, when the lift degree of the intake valve 351 is increased, the motor 355 is driven so that the moving range of the contact point A is moved to the front end side of the lift surface 311. When the lift degree of the intake valve 351 is reduced, the motor 355 is driven so that the moving range of the contact point A is moved to the front end side of the base circular surface 312.

Therefore, according to the present preferred embodiment, the amount of air taken into the engine 7 can readily be adjusted by controlling the motor 355. Consequently, the output of the engine 7 can easily be adjusted in response to various conditions.

(5) Use of Brushless DC Motor

Figure 7:
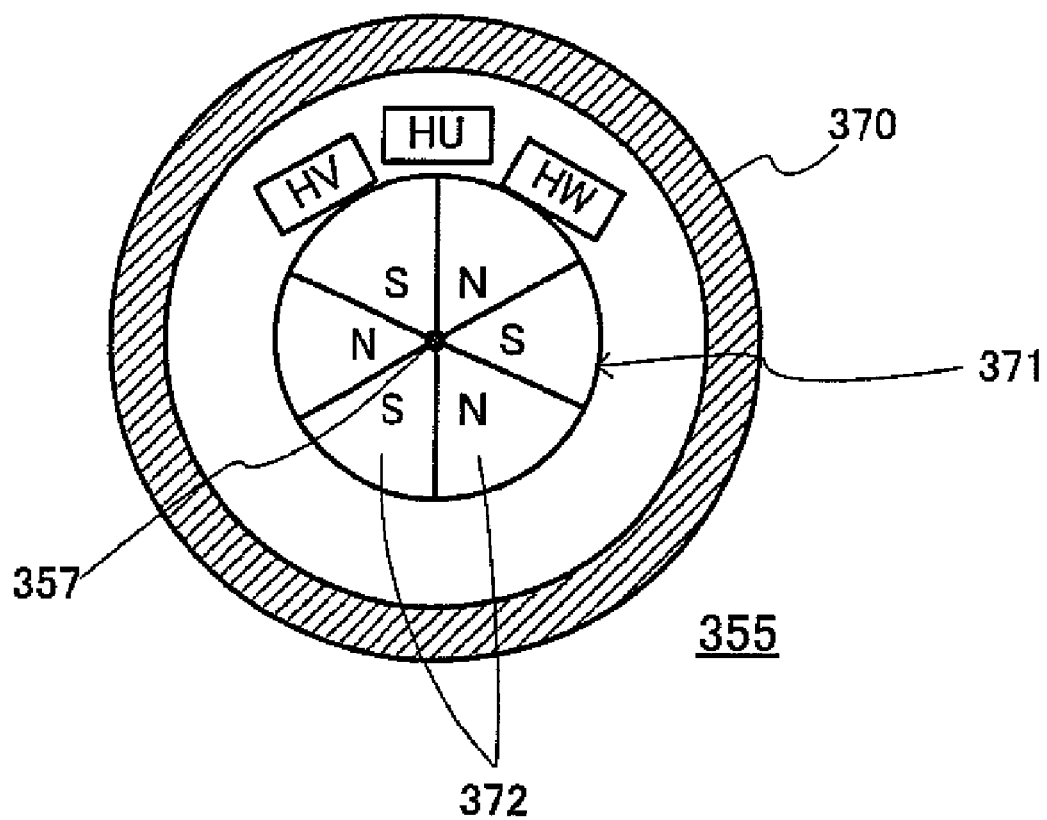
FIG. 7 is a cross sectional view of the structure of the brushless DC motor in FIG. 2.

According to the present preferred embodiment, a well-known brushless DC motor, for example, is preferably used as the motor 355. Referring to FIG. 7, the brushless DC motor 355 generally includes a cylindrical box 370, a rotation shaft 357, a rotor 371 made of a permanent magnet, a stator (not shown) made of a driving coil, and magnetic pole sensors HU, HV, and HW. The rotor 371 is rotatably supported by the box 370 together with the rotation shaft 357. The brushless DC motor 355 has three phases, i.e., U, V, and W phases, and the rotor 371 includes three permanent magnets and has six magnetic poles 372, for example. The magnetic poles 372 are provided at every 60° of the rotor 371. The N and S poles are alternately provided. Three magnetic pole sensors HU, HV, and HW are provided around the rotor 371. The magnetic pole sensors HU, HV, and HW are provided for every 30°, for example. In the brushless DC motor 355, the magnetic pole sensors HU, HV, and HW detect the position (rotation angle) of the rotor 371, and the stator defines a three-phase rotating magnetic field. This allows the rotor to rotate. It is noted that while this preferred embodiment preferably includes three magnetic pole sensors, any desirable number of pole sensor could be used.

Figure 8:
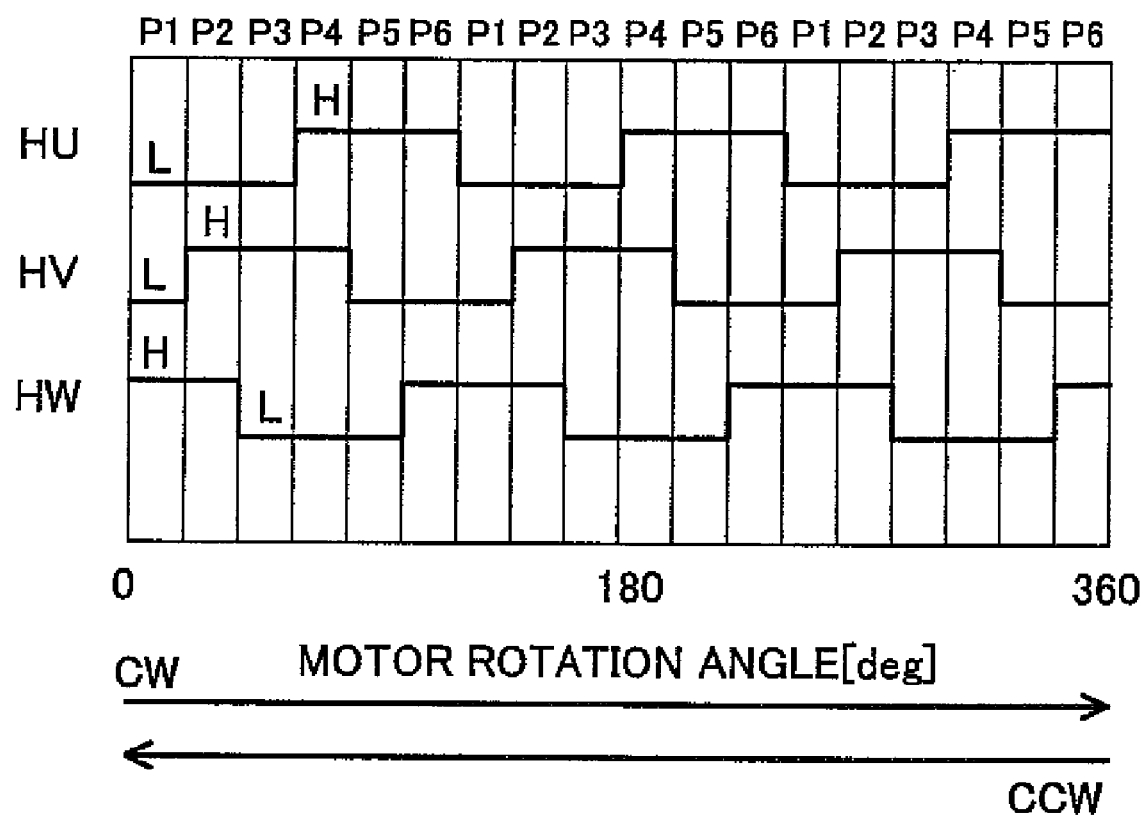
FIG. 8 is a timing chart showing the output signals of magnetic pole sensors in FIG. 7.

When the rotor 371 makes one rotation (360°), the magnetic pole sensors HU, HV, and HW output signals in waveforms shown in FIG. 8. The signals each have six pulse patterns P1 to P6 for each 120° as given in the following Table 1. When the magnetic pole pulse patterns are represented by binary notation and decimal notation, P1=001=1, P2=011=3, P3=010=2, P4=110=6, P5=100=4, and P6=101=5.

TABLE 1

| HU | HV | HW | Decimal | Magnetic pole pulse pattern |
|----|----|----|---------|------------------------------|
| L  | L  | H  | 1       | P1 |
| L  | H  | H  | 3       | P2 |
| L  | H  | L  | 2       | P3 |
| H  | H  | L  | 6       | P4 |
| H  | L  | L  | 4       | P5 |
| H  | L  | H  | 5       | P6 |

When the motor 355 rotates clockwise (CW), the magnetic pole pulse pattern changes in the sequence of P1, P2, P3, P4, P5, and P6. On the other hand, when the motor 355 rotates counterclockwise (CCW), the magnetic pole pulse pattern changes in the sequence of P6, P5, P4, P3, P2 and P1.

(6) Output Adjustment of Engine by ECU

Now, the output control of the engines 7 by the ECU 16 according to a preferred embodiment of the present invention will be described.

The ECU 16 adjusts the output of the engine 7 by the above-described method (by adjusting the position of the small diameter part 572) and controls backup driving when the control shaft sensor 151 has a failure.

Figure 9:
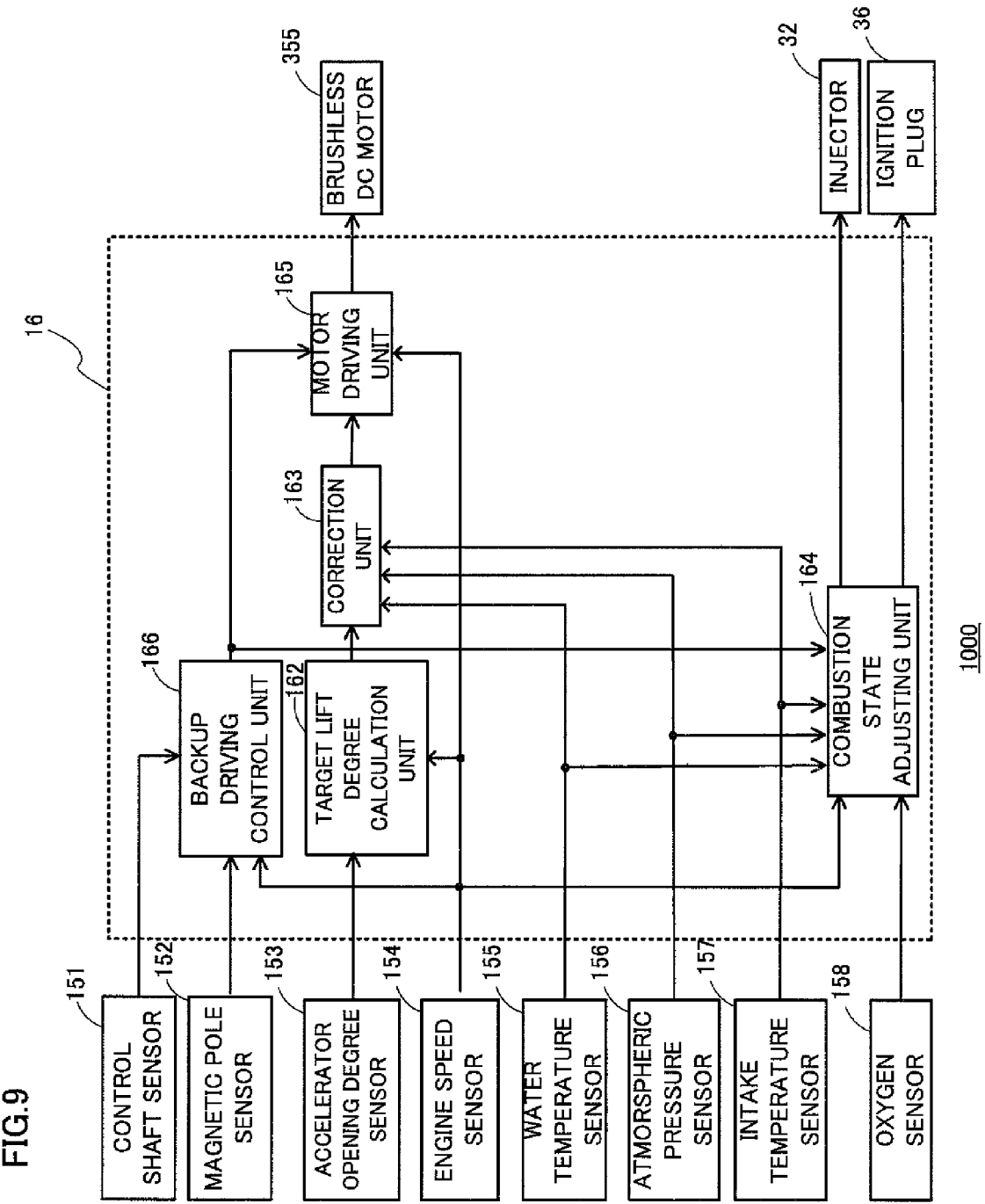
FIG. 9 is a functional block diagram showing the structure of the ECU and its periphery shown in FIG. 1.

FIG. 9 is a block diagram of the configuration of a control system for adjusting the output of the engine 7. As shown in FIG. 9, a control system 1000 according to the present preferred embodiment includes a control shaft sensor 151, magnetic pole sensors 152 (for example, HU, HV, and HW in FIG. 7), an accelerator opening degree sensor 153, an engine speed sensor 154, a water temperature sensor 155, an atmospheric pressure sensor 156, an intake temperature sensor 157, an oxygen sensor 158, an ECU 16, a brushless DC motor 355, an injector 32, and an ignition plug 36.

The ECU 16 includes a target lift degree calculation unit 162, a correction unit 163, a motor driving unit 165, a backup driving control unit 166, and a combustion state adjusting unit 164.

The control shaft sensor 151 detects a rotation angle from the reference position of the control shaft 57 (such as the position of the control shaft 57 for the minimum lift degree of the intake valve 351) and applies the result to the backup driving control unit 166. The magnetic pole sensor 152 detects the magnetic pole 372 of the rotor 371 and applies the output signal shown in FIG. 8 to the backup driving control unit 166. The accelerator opening degree sensor 153 detects the opening degree (the opening degree of the accelerator) of an accelerator grip (not shown) provided at the handle 6 (FIG. 1) and applies the result to the target lift degree calculation unit 162. The engine speed sensor 154 detects the engine speed of the engine 7 (FIG. 1) and applies the detection result to the target lift degree calculation unit 162, the backup driving control unit 166, the motor driving unit 165, and the combustion state adjusting unit 164. The water temperature sensor 155 detects the temperature of the cooling water of the engine 7 and applies the detection result to the correction unit 163 and the combustion state adjusting unit 164. The atmospheric pressure sensor 156 detects the atmospheric pressure and applies the detection result to the correction unit 163 and the combustion state adjusting unit 164. The intake temperature sensor 157 detects the temperature of the air taken into the engine 7 (FIG. 1) and applies the result to the correction unit 163 and the combustion state adjusting unit 164. The oxygen sensor 158 detects the oxygen concentration of the exhaust gas discharged from the engine 7 and applies the detection result to the correction unit 163 and the combustion state adjusting unit 164.

The target lift degree calculation unit 162 includes a storage device (not shown). The storage device previously stores map information representing the relation among the opening degree of the accelerator, the engine speed, and the lift degree of the intake valve 351. The target lift degree calculation unit 162 calculates the lift degree of the intake valve 351 based on the outputs of the accelerator opening degree sensor 153 and the engine speed sensor 154 and the map information stored in the storage device. In the following description, the lift degree calculated by the target lift degree calculation unit 162 will be referred to as "target lift degree."

The correction unit 163 corrects the target lift degree based on the outputs of the water temperature sensor 155, the atmospheric pressure sensor 156, the intake temperature sensor 157 and various other kinds of sensors.

The backup driving control unit 166 calculates the rotation angle of the brushless DC motor 355 based on the output signal of the magnetic pole sensor 152, then calculates an estimated rotation angle of the control shaft 57 based on the calculated rotation angle and stores the calculation result in the storage device (not shown). The backup driving control unit 166 also determines whether or not the control shaft sensor 151 is operating normally. The backup driving control unit 166 specifically compares the actual rotation angle detected by the control shaft sensor 151 and the estimated rotation angle stored in the above-described storage device and determines that the control shaft sensor 151 is operating normally if the difference between the actual rotation angle and the estimated rotation angle is within a prescribed range and that the control shaft sensor 151 is operating abnormally if the difference between the actual rotation angle and the estimated rotation angle is not within the prescribed range. The backup driving control unit 166 applies the actual rotation angle to the motor driving unit 165 after determining that the control shaft sensor 151 is operating normally and applies the estimated rotation angle to the motor driving unit 165 after determining that the control shaft sensor 151 is operating abnormally.

The motor driving unit 165 applies a command value to the motor 355 based on the target lift degree and the actual rotation angle or the estimated rotation angle so that the intake valve 351 is driven with the corrected target lift degree. In this way, the motor 355 is driven and the small diameter part 572 (FIG. 6) is moved to a prescribed position. Consequently, the intake valve 351 is driven with the target lift degree.

The combustion state adjusting unit 164 determines the injection amount and the injection timing of fuel injected from the injector 32 and the ignition timing of air-fuel mixture by the ignition plug 36 based on the actual rotation angle of the control shaft or the estimated rotation angle applied from the backup driving control unit 166 and the outputs of the water temperature sensor 155, the atmospheric pressure sensor 156, the intake temperature sensor 157, the oxygen sensor 158 and various other kinds of sensors. The combustion state adjusting unit 164 controls the injection of fuel by the injector 32 based on the determined injection amount and the injection timing and controls ignition of fuel-air mixture by the ignition plug 36 based on the determined ignition timing.

Now, the control operation of the ECU 16 will be described in detail.

Figure 10:
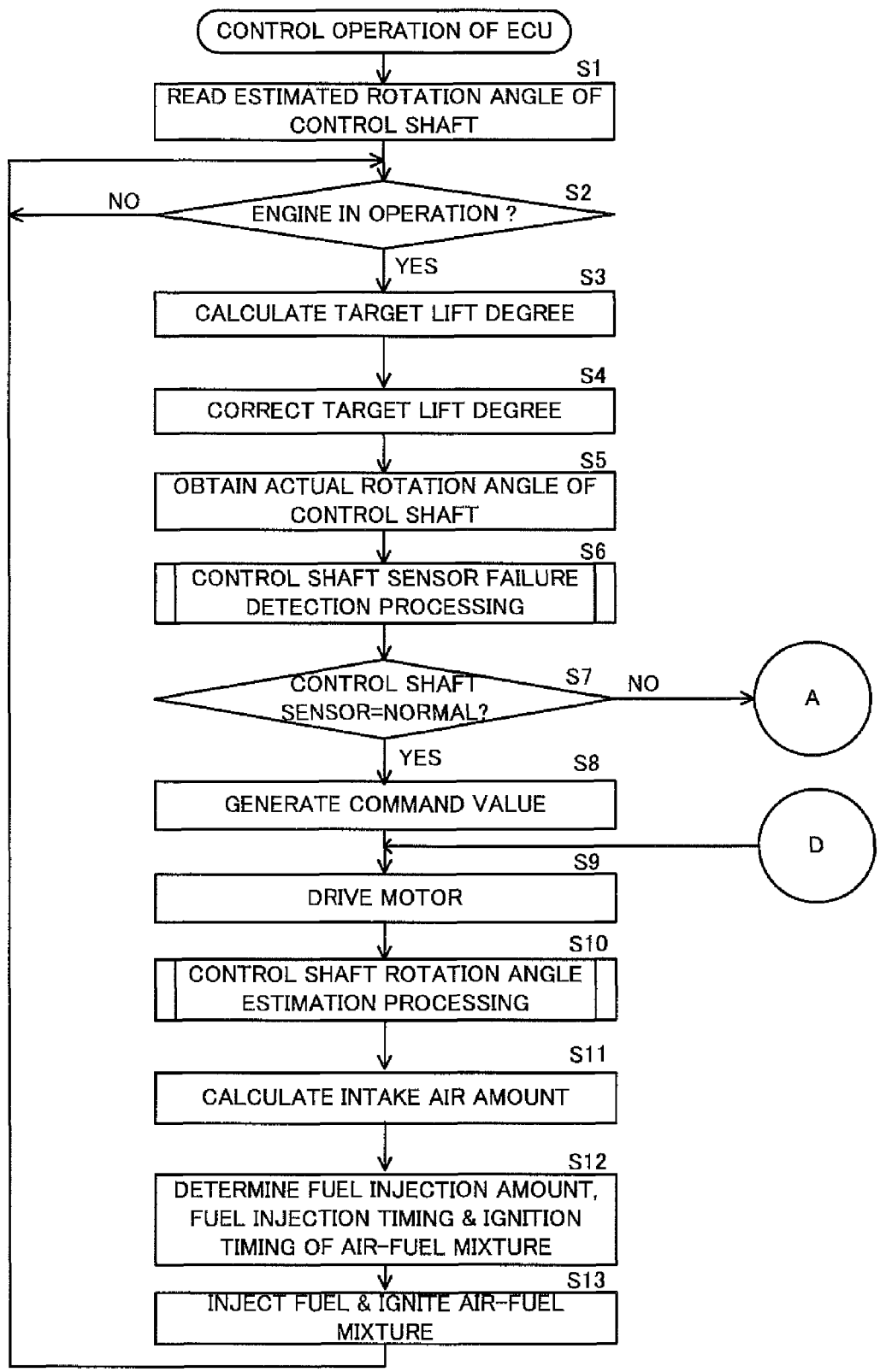
FIG. 10 is a flowchart showing the operation of the ECU shown in FIG. 9.

Referring to FIG. 10, the backup driving control unit 166 reads the estimated rotation angle of the control shaft 57 (S1). The estimated rotation angle read in this step has been calculated and saved in step S106 (FIG. 12) that will be described and the estimated rotation angle immediately before the last time the engine became stationary. When the engine is started for the first time after the manufacture of the motorcycle 100, no such estimated rotation angle is saved and therefore a predetermined estimated rotation angle is read.

Then, the target lift degree calculation unit 162 determines whether or not the engine 7 operates based on the output of the engine speed sensor 154 (S2). If the engine 7 operates (YES in S2), the target lift degree calculation unit 162 calculates a target lift degree for the intake valve 351 based on the outputs of the accelerator opening degree sensor 153 and the engine speed sensor 154 and the map information stored in the storage device (S3). If the engine 7 does not operate (NO in S2), the target lift degree calculation unit 162 stands by until the engine 7 operates.

The correction unit 163 then corrects the target lift degree calculated in step S3 based on the outputs of the water temperature sensor 155, the atmospheric pressure sensor 156 and the intake temperature sensor 157 (S4).

The backup driving control unit 166 obtains the actual rotation angle of the control shaft 57 from the control shaft sensor 151 (S5).

The backup driving control unit 166 then carries out predetermined control shaft sensor failure detection processing (S6) and determines whether or not the control shaft sensor 151 is operating normally (S7). Details of the control shaft sensor failure detection processing will be described later.

If the control shaft sensor 151 is operating normally (YES in S7), the backup driving control unit 166 applies the actual rotation angle obtained in step S5 to the motor driving unit 165. The motor driving unit 165 generates a command value to the motor 355 based on the actual rotation angle so that the intake valve 351 is driven with the target lift degree corrected in step S4 (S8). More specifically, how much the control shaft 57 must be rotated from the present actual rotation angle to drive the intake valve 351 with the target lift degree is calculated. The processing to be performed if the control shaft sensor 151 is operating abnormally (NO in S7) will be described later.

The motor driving unit 165 drives the motor 355 based on the command value generated in step S8 (S9).

The backup driving control unit 166 then carries out predetermined control shaft rotation angle estimation processing (S10). More specifically, an estimated rotation angle of the control shaft 57 is calculated based on the output of the magnetic pole sensor 152, details of which will be described later.

The combustion state adjusting unit 164 calculates the amounts of air to be taken into the four cylinders 33 in the engine 7 based on the actual rotation angle of the control shaft 57 detected by the control shaft sensor 151 (when the control shaft sensor 151 is operating normally) or the estimated rotation angle of the control shaft sensor 57 calculated in step S10 (when the control shaft sensor 151 is operating abnormally) and the speed of the engine 7 detected by the engine speed sensor 154 (S11).

The combustion state adjusting unit 164 determines the injection amount and the injection timing of fuel to be injected from the injector 32 and the ignition timing of air-fuel mixture by the ignition plug 36 based on the intake air amount of each cylinder 33 calculated in step S11 and the outputs of the water temperature sensor 155, the atmospheric pressure sensor 156, the intake temperature sensor 157, the oxygen sensor 158, and various other kinds of sensors (S12).

Finally, the combustion state adjusting unit 164 controls fuel injection by the injector 32 based on the fuel injection amount and the fuel injection timing determined in step S9 and controls ignition of air-fuel mixture by the ignition plug 36 based on the ignition timing determined in step S9 (S13). Then, the ECU 16 returns to step S2.

(7) Control Shaft Sensor Failure Detection Processing

Now, the control shaft sensor failure detection processing in step S6 will be described in detail.

Figure 11:
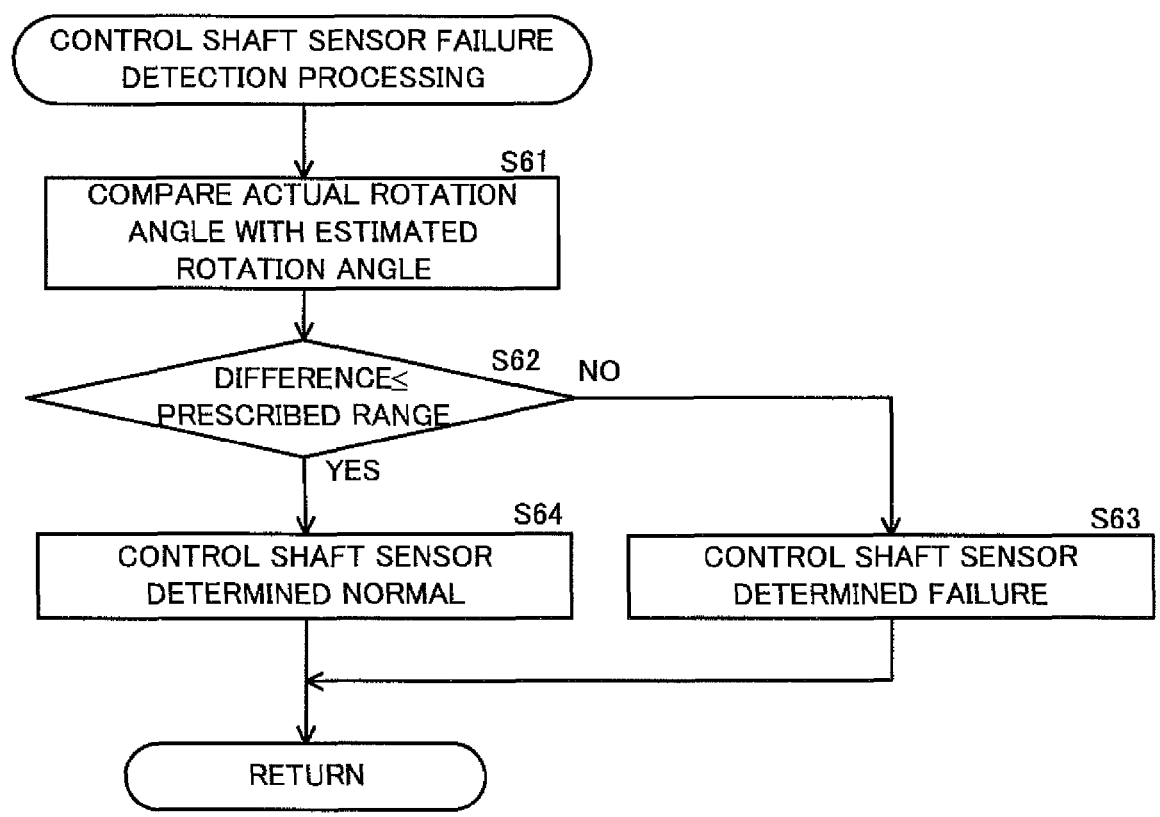
FIG. 11 is a flowchart showing the control shaft sensor failure detecting processing in FIG. 10.

Referring to FIG. 11, the backup driving control unit 166 compares the actual rotation angle of the control shaft 57 obtained in step S5 and the estimated rotation angle of the control shaft sensor 57 calculated in step S10 in the previous processing (S61). However, the estimated rotation angle of the control shaft 57 is not yet calculated immediately after the start of the engine 7 and therefore the estimated rotation angle read in step S1 is used instead.

As a result of the comparison, the backup driving control unit 166 determines whether the difference between the actual rotation angle and the estimated rotation angle is not within a prescribed range (S62). If the difference is not within the prescribed range (NO in S62), the backup driving control unit 166 determines that the control shaft sensor 151 has an abnormality (failure) such as the locking and detachment of the mechanism (S63).

On the other hand, if the difference is not more than the prescribed value (YES in S62), the backup driving control unit 166 determines that the control shaft sensor 151 is operating normally (S64).

(8) Control Shaft Rotation Angle Estimation Processing

Now, the control shaft rotation angle estimation processing in step S10 will be described in detail.

Figure 12:
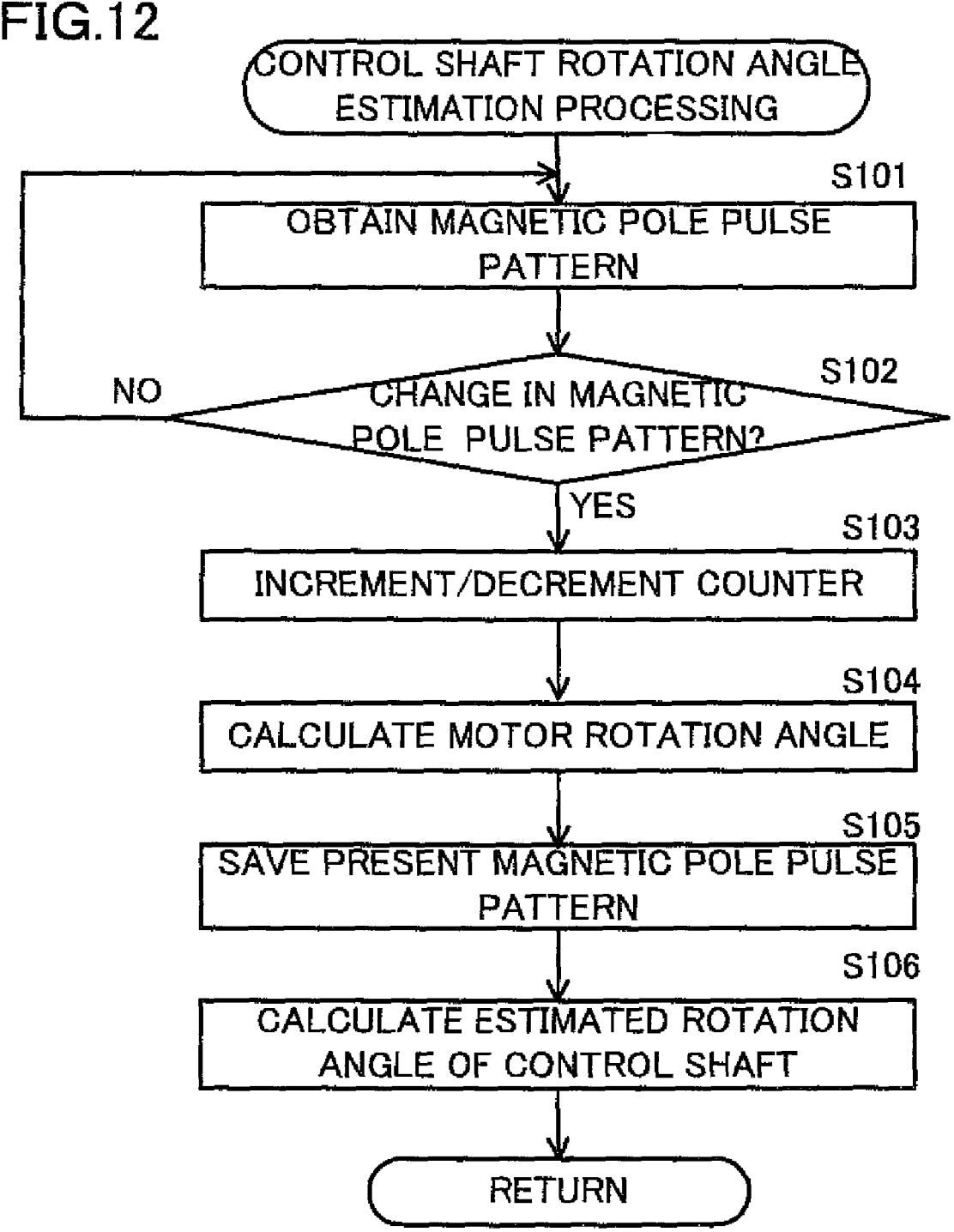
FIG. 12 is a flowchart showing the control shaft rotation angle estimation processing in FIG. 10.
Figure 13:
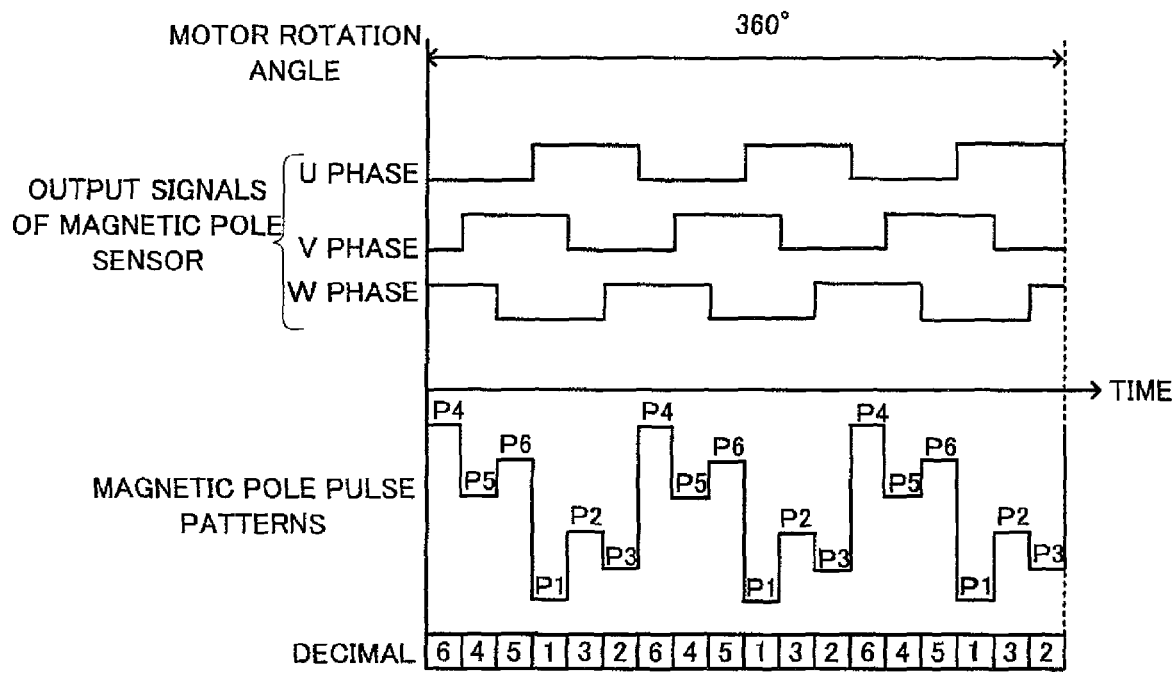
FIG. 13 is a timing chart showing an example of the output signals of magnetic pole sensors and the magnetic pole pulse patterns detected in the control shaft rotation angle estimation processing shown in FIG. 12.

Referring to FIG. 12, the backup driving control unit 166 obtains the magnetic pole pulse patterns P1 to P6 from the magnetic pole sensors 152 (S101). An example of the output signals of the magnetic pole sensors 152 and the magnetic pole pulse patterns corresponding to the signals are shown in FIG. 13. In this case, the motor 355 rotates clockwise and therefore the magnetic pole pulse pattern repeatedly changes in the sequence of P1, P2, P3, P4, P5, and P6.

Figure 14:
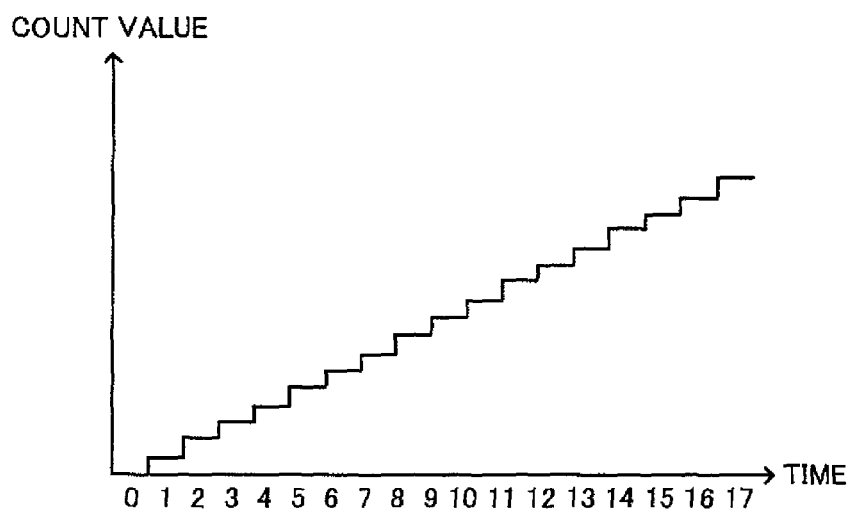
FIG. 14 is a timing chart showing an example of a count value counted by a rotation angle counter in the control shaft rotation angle estimation processing in FIG. 12.
Figure 15:
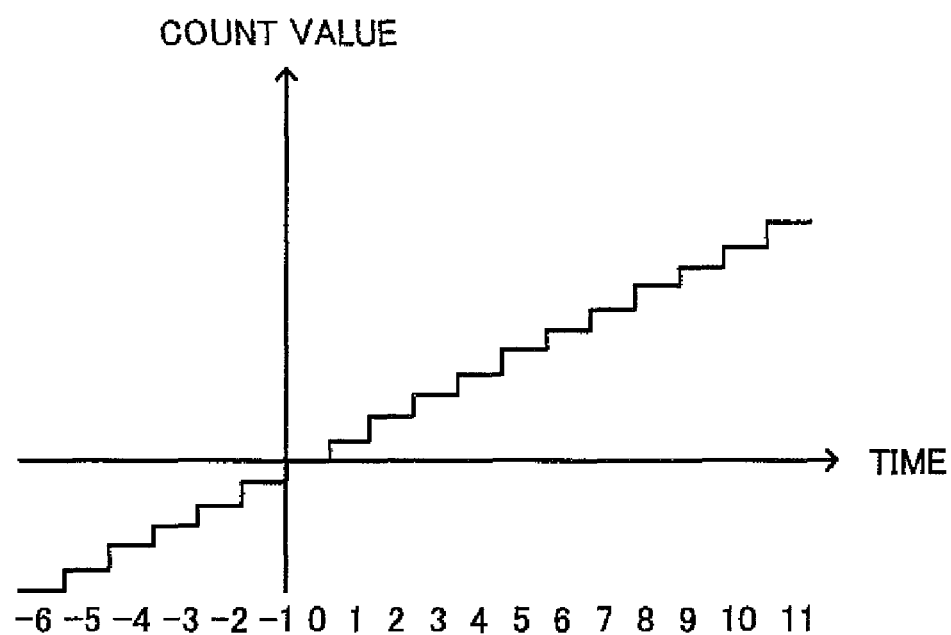
FIG. 15 is a timing chart showing another example of a count value counted by the rotation angle counter in the control shaft rotation angle estimation processing in FIG. 12.

Upon receiving the changes among the magnetic pole pulse patterns P1 to P6 (YES in S102), the backup driving control unit 166 increments or decrements the rotation angle counter (a variable set to count the rotation angle of the motor 355) (S103). More specifically, when the magnetic pole pulse patterns P1 to P6 change clockwise, the rotation angle counter is incremented and when the magnetic pole pulse patterns P1 to P6 change counter-clockwise, the rotation angle counter is decremented. When the motor 355 rotates clockwise, the rotation angle counter has its value incremented by one as shown in FIG. 14. In the example shown in FIG. 14, the rotation angle counter is set to an initial value "0" when the throttle is fully closed. However, the rotation counter may be set to the initial value "0" when the throttle is half open as in the example shown in FIG. 15.

The above-described processing is repeated as long as the engine 7 operates and the magnetic pole pulse pattern is obtained every time it changes. The interval of obtaining the pattern is set not to exceed a prescribed period so that all the magnetic pole pulse patterns changing at high speed can be obtained even when the motor 355 rotates at the maximum speed. In the present preferred embodiment, the control shaft rotation angle estimation processing S10 is included in the series of processing steps shown in FIG. 10 but the control shaft rotation angle estimation processing S10 only can be independent from the other processing in FIG. 10 and carried out at prescribed intervals.

The backup driving control unit 166 calculates the rotation angle of the motor 355 based on the value of the rotation angle counter (S104). As shown in FIG. 8, there are the six magnetic pole pulse patterns P1 to P6 for every 120°, and therefore the motor 355 is rotated by 20° for one magnetic pole pulse pattern. Therefore, the rotation angle of the motor 355 is calculated by the following Expression (1):

$$\text{Motor rotation angle} = 20 \times \text{count value} \quad (1)$$

The backup driving control unit 166 then saves the presently obtained magnetic pole pulse patterns in the storage device (S105). The magnetic pole pulse patterns saved here are used to determine whether there is a change in the magnetic pole pulse pattern in the next step S102 and whether the motor 355 rotates clockwise or counter-clockwise if there is a change.

Finally, the backup driving control unit 166 calculates the estimated rotation angle of the control shaft 57 based on the rotation angle of the motor 355 (S106). When the worm gear ratio between the rotation shaft 357 of the motor 355 and the control shaft 57 is 2:49, the control shaft 57 rotates by about 0.82° (=20°×(2/49)) for one magnetic pole pulse pattern. Therefore, the estimated rotation angle of the control shaft 57 is calculated by the following Expression (2):

$$\text{Estimated rotation angle of control shaft} = 0.82° \times \text{count value} + \text{previous estimated rotation angle} \quad (2)$$

Here, the estimated rotation angle stored in the backup driving control unit 166 is used as the previous estimated rotation angle. Once the estimated rotation angle of the control shaft 57 is calculated, the storage device in the backup driving control unit 166 is overwritten with the obtained value.

(9) Processing Upon Determining Abnormality for Control Shaft Sensor

Now, the processing to carry out when the control shaft sensor 151 is operating abnormally will be described.

Figure 16:
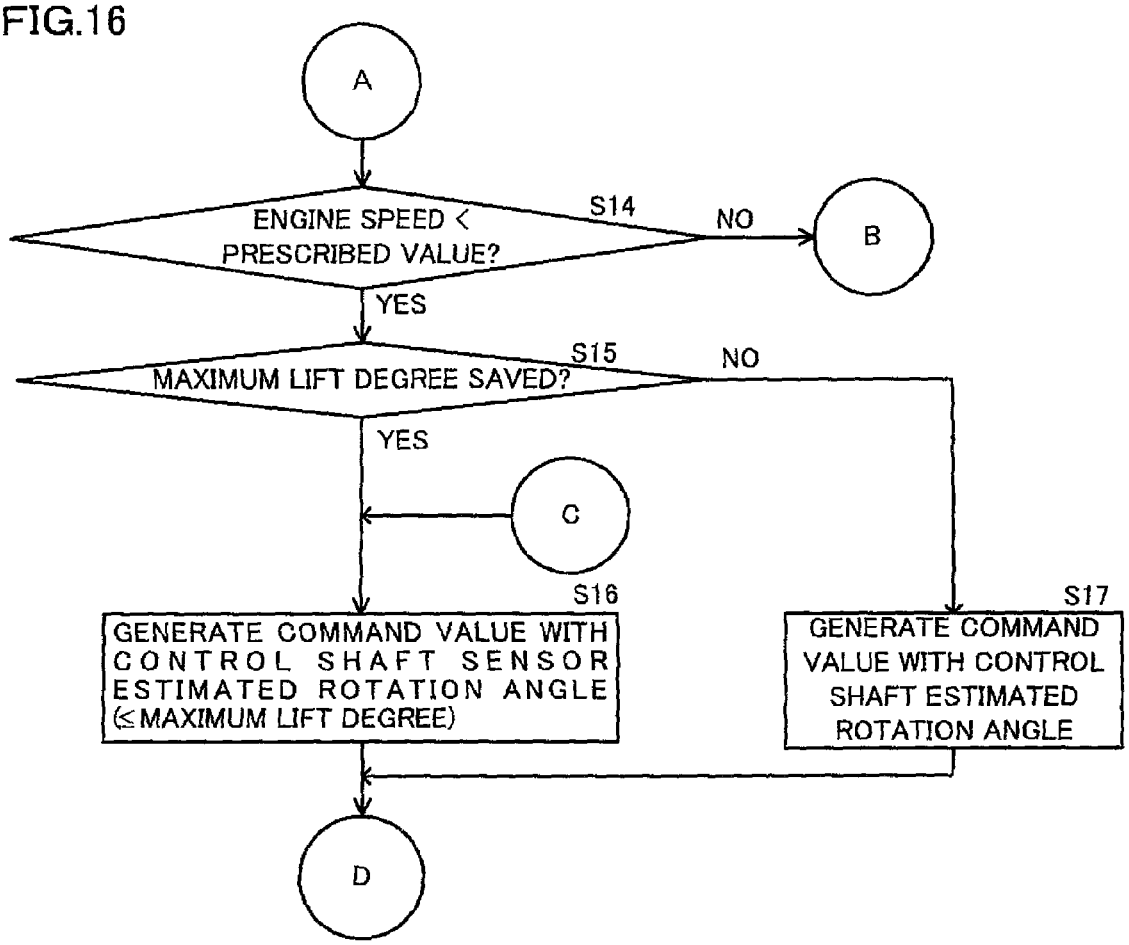
FIG. 16 is a flowchart showing processing when a failure in a control shaft sensor is detected during the operation of the ECU in FIG. 10.

Referring to FIG. 16, the backup driving control unit 166 determines whether or not the speed of the engine 7 is lower than a prescribed value (such as 3000 rpm) based on the output of the engine speed sensor 154 (S14). The prescribed value is previously saved in the storage device (not shown) in the backup driving control unit 166.

If the speed of the engine 7 is lower than the prescribed value (YES in S14), the backup driving control unit 166 determines whether or not the maximum lift degree is saved in the storage device (S15). The maximum lift degree is saved in step S22 (FIG. 17) that will be described and the maximum value for the lift degree tolerated during backup driving.

When the maximum lift degree is saved (YES in S15), the backup driving control unit 166 applies the maximum lift degree and the estimated rotation angle of the control shaft 57 to the motor driving unit 165. The motor driving unit 165 compares the maximum lift degree and the target lift degree applied from the correction unit 163 and generates a command value to the brushless DC motor 355 based on the smaller one of these values and the estimated rotation angle (S16). More specifically, the motor driving unit 165 generates a command value to the brushless DC motor 355 in a range less than the maximum lift degree. On the other hand, if the maximum lift degree is not saved (NO in S15), the backup driving control unit 166 applies the estimated rotation angle of the control shaft 57 to the motor driving unit 165. The motor driving unit 165 generates a command value to the brushless DC motor 355 based on the target lift degree applied from the correction unit 163 and the estimated rotation angle (S17). After the command value is generated, the ECU 16 moves to step S9 (FIG. 10).

Figure 17:
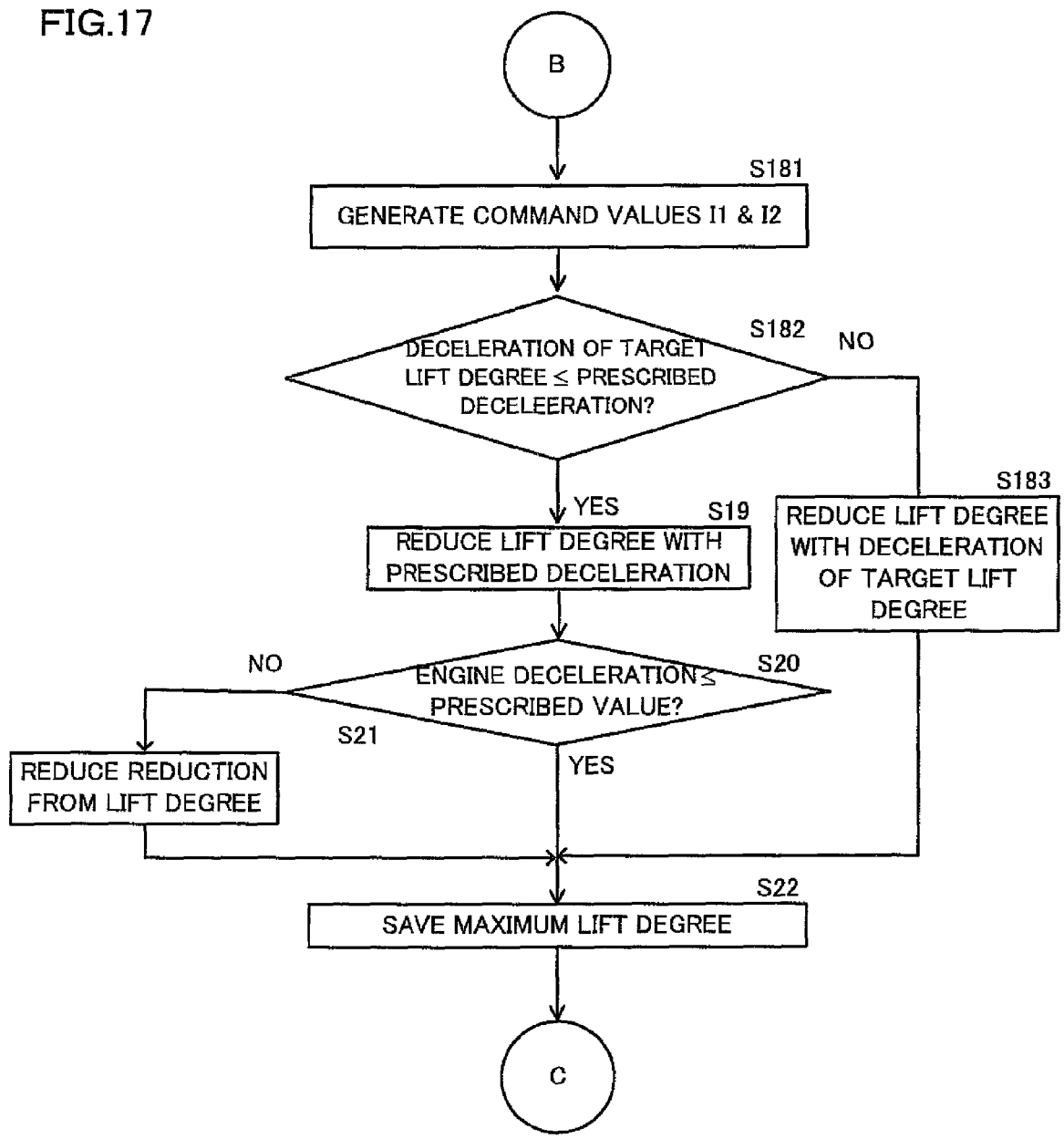
FIG. 17 is a flowchart showing processing when the engine speed is higher than a prescribed value in the processing shown in FIG. 16.

Meanwhile, referring to FIG. 17, if the speed of the engine 7 is higher than the prescribed value (NO in S14), the backup driving control unit 166 applies the estimated rotation angle of the control shaft 57 to the motor driving unit 165. The motor driving unit 165 generates a command value I1 to the brushless DC motor 355 based on the estimated rotation angle and the target lift degree applied from the correction unit 163 and generates a command value I2 to the brushless DC motor 355 so that the lift degree is reduced with a prescribed deceleration (a negative acceleration such as, for example, −1.0 mm/s$^2$) based on the estimated rotation angle (S181). The motor driving unit 165 drives the brushless DC motor 355 based on one of the command values I1 and I2 that provides a greater degree of reduction (deceleration) in the lift degree. More specifically, the motor driving unit 165 compares the command values I1 and I2 and if the deceleration of the target lift degree ("the absolute value of the deceleration" to be accurate because the deceleration is a negative acceleration: hereinafter the same shall apply) is not more than a prescribed deceleration (YES in S182), the motor driving unit 165 drives the brushless DC motor 355 so that the lift degree is reduced at the prescribed deceleration (S19). If the deceleration of the target lift degree is a positive acceleration, (in the other word, if the target lift degree increasing the lift degree is applied), the motor driving unit 165 drives the blushless DC motor 355 so that the lift degree is reduced at the prescribed deceleration. The prescribed deceleration is previously saved in the storage device (not shown) in the motor driving unit 165. In this way, the speed of the engine 7 is gradually lowered, and the speed of the motorcycle 100 is gradually lowered accordingly, so that the rider can be aware of a failure caused in the control shaft sensor 151. On the other hand, if the deceleration of the target lift degree is greater than the prescribed deceleration (NO in S182), the motor driving unit 165 drives the brushless DC motor 355 so that the lift degree is reduced with the deceleration of the target lift degree (S183). In this way, the speed of the engine 7 can quickly be lowered according to the rider's intention.

The motor driving unit 165 then determines whether the deceleration of the speed of the engine 7 detected by the engine speed sensor 154 is not more than a prescribed value (such as −1000 rpm/s) (S20). The prescribed value is saved in the storage device (not shown) in the motor driving unit 165.

If the deceleration of the speed of the engine 7 exceeds the prescribed value (NO in S20), the motor driving unit 165 reduces the amount of reduction in the lift degree in step S19 (such as −0.5 mm) (S21). In this way, the speed of the motorcycle 100 can be lowered gradually.

Finally, the backup driving control unit 166 saves the present lift degree as the maximum lift degree in the storage device (not shown) (S22). Thereafter, the ECU 16 moves to step S16 (FIG. 16).

Note that the target lift degree calculation unit 162, the correction unit 163, the combustion state adjusting unit 164, and the backup driving control unit 166 shown in FIG. 9 may be implemented by a CPU (Central Processing Unit) and programs, or all or part of these elements may be implemented by hardware such as electronic circuits, for example.

As in the foregoing, according to the present preferred embodiment of the present invention, if it is determined that the control shaft sensor 151 is operating abnormally, the rotation angle of the brushless DC motor 355 is detected by the magnetic pole sensors 152 and an estimated rotation angle of the control shaft 57 is calculated based on the rotation angle, so that if the control shaft sensor 151 has a failure, the injection amount of fuel or the like can be controlled based on the estimated rotation angle.

According to the present preferred embodiment, the brushless DC motor is preferably used, but any of various kinds of motors including an AC motor may be employed instead. The motor preferably includes a sensor that detects the rotation of a rotor. The sensor outputs a signal based on the rotation angle of the motor.

Although the preferred embodiments of the present invention have been described and illustrated in detail, the same is by way of illustration and example only. The present invention is not limited by the described preferred embodiments and may be embodied in various modified forms without departing from the spirit and scope of the invention.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A variable valve device arranged to change a displacement of an intake valve in an engine, comprising:
   a control shaft arranged to change the displacement of the intake valve by operating a mechanism arranged to drive the intake valve;
   a motor arranged to rotate the control shaft;
   a motor driver arranged to drive the motor according to a speed of the engine and an opening degree of an accelerator;
   a control shaft sensor arranged to detect an actual rotation angle of the control shaft;
   a control shaft rotation angle estimator arranged to calculate a rotation angle of the motor and to calculate an estimated rotation angle of the control shaft based on the calculated rotation angle;
   a control shaft sensor failure detector arranged to determine whether or not the control shaft sensor is operating normally; and a combustion state adjuster arranged to control at least one of a fuel injection amount, fuel injection timing, and ignition timing of the engine based on the actual rotation angle detected by the control shaft sensor if the control shaft sensor failure detector determines that the control shaft sensor is operating normally and based on the estimated rotation angle calculated by the control shaft rotation angle estimator if the control shaft sensor failure detector determines that the control shaft sensor is not operating normally.

2. The variable valve device according to claim 1, wherein the motor comprises:
a rotor; and
a sensor arranged to detect a rotation of the rotor; wherein
the control shaft rotation angle estimator is arranged to calculate the rotation angle of the motor based on an output signal of the sensor and to calculate an estimated rotation angle of the control shaft based on the calculated rotation angle.

3. The variable valve device according to claim 1, wherein:
the motor includes a brushless DC motor having a plurality of magnetic pole sensors; and
the control shaft rotation angle estimator is arranged to calculate a rotation angle of the brushless DC motor based on an output signal of the magnetic pole sensor and to calculate an estimated rotation angle of the control shaft based on the calculated rotation angle.

4. The variable valve device according to claim 1, wherein the control shaft sensor failure detector comprises:
a comparator arranged to compare the actual rotation angle detected by the control shaft sensor with the estimated rotation angle calculated by the control shaft rotation angle estimator; and
a determiner arranged to determine that the control shaft sensor is operating normally if the difference between the actual rotation angle and the estimated rotation angle is within a prescribed range and that the control shaft sensor is not operating normally if the difference between the actual rotation angle and the estimated rotation angle is not within the prescribed range based on the result of comparison by the comparator.

5. The variable valve device according to claim 1, further comprising:
an engine speed determiner arranged to determine whether or not the speed of the engine is lower than a prescribed value if the control shaft sensor failure detector determines that the control shaft sensor is not operating normally; and
a displacement reducer arranged to reduce the displacement if the engine speed determiner determines that the speed of the engine is higher than a prescribed value.

6. The variable valve device according to claim 5, further comprising:
a target displacement calculator arranged to calculate a target displacement of the intake valve according to the speed of the engine and the opening degree of the accelerator; wherein
the displacement reducer is arranged to compare a deceleration of the target displacement calculated by the target displacement calculator with a prescribed deceleration and to reduce the displacement by the greater deceleration.

7. The variable valve device according to claim 5, further comprising:
a maximum displacement saver arranged to save the displacement reduced by the displacement reducer as maximum displacement; wherein the motor driver is arranged to drive the motor so that the displacement exceeds the maximum displacement saved by the maximum displacement saver if the engine speed determiner determines that the speed of the engine is lower than the prescribed value.

8. The variable valve device according to claim 5, further comprising:
a deceleration determiner arranged to determine whether or not a deceleration of the speed of the engine is smaller than a prescribed value; and
a deceleration relaxer arranged to reduce the displacement to be reduced by the displacement reducer if the deceleration determiner determines that the deceleration is greater than the prescribed value.

9. A motorcycle, comprising:
an engine,
an intake valve driving mechanism arranged to drive an intake valve in the engine; and
a variable valve device arranged to change a displacement of the intake valve; wherein
the variable valve device includes:
a control shaft arranged to change the displacement of the intake valve by operating the intake valve driving mechanism;
a motor arranged to rotate the control shaft;
a motor driver arranged to drive the motor according to a speed of the engine and an opening degree of an accelerator;
a control shaft sensor arranged to detect an actual rotation angle of the control shaft;
a control shaft rotation angle estimator arranged to calculate a rotation angle of the motor and to calculate an estimated rotation angle of the control shaft based on the calculated rotation angle;
a control shaft sensor failure detector arranged to determine whether or not the control shaft sensor is operating normally; and
a combustion state adjuster arranged to control at least one of a fuel injection amount, fuel injection timing, and ignition timing of the engine based on the actual rotation angle detected by the control shaft sensor if the control shaft sensor failure detector determines that the control shaft sensor is operating normally and based on the estimated rotation angle calculated by the control shaft rotation angle estimator if the control shaft sensor failure detector determines that the control shaft sensor is not operating normally.

10. The motorcycle according to claim 9, wherein:
the motor comprises:
a rotor; and
a sensor arranged to detect a rotation of the rotor; and
the control shaft rotation angle estimator calculates the rotation angle of the motor based on an output signal of the sensor and calculates an estimated rotation angle of the control shaft based on the calculated rotation angle.

11. The motorcycle according to claim 9, wherein:
the motor includes a brushless DC motor having a plurality of magnetic pole sensors; and
the control shaft rotation angle estimator is arranged to calculate a rotation angle of the brushless DC motor based on an output signal of the magnetic pole sensor and calculate an estimated rotation angle of the control shaft based on the calculated rotation angle.

12. The motorcycle according to claim 9, wherein the control shaft sensor failure detector comprises:

a comparator arranged to compare the actual rotation angle detected by the control shaft sensor with the estimated rotation angle calculated by the control shaft rotation angle estimator; and a determiner arranged to determine that the control shaft sensor is operating normally if the difference between the actual rotation angle and the estimated rotation angle is within a prescribed range and that the control shaft sensor is not operating normally if the difference between the actual rotation angle and the estimated rotation angle is not within the prescribed range based on the result of comparison by the comparator.

13. The motorcycle according to claim 9, wherein the variable valve device further comprises:

an engine speed determiner arranged to determine whether or not the speed of the engine is lower than a prescribed value if the control shaft sensor failure detector determines that the control shaft sensor is not operating normally; and a displacement reducer arranged to reduce the displacement if the engine speed determiner determines that the speed of the engine is higher than a prescribed value.

14. The motorcycle according to claim 13, wherein:

the variable valve device further comprises a target displacement calculator arranged to calculate a target displacement of the intake valve according to the speed of the engine and the opening degree of the accelerator; and the displacement reducer is arranged to compare a deceleration of the target displacement calculated by the target displacement calculator with a prescribed deceleration and reduce the displacement by the greater deceleration.

15. The motorcycle according to claim 13, wherein:

the variable valve device further comprises a maximum displacement saver arranged to save the displacement reduced by the displacement reducer as maximum displacement; and the motor driver is arranged to drive the motor so that the displacement exceeds the maximum displacement saved by the maximum displacement saver if the engine speed determiner determines that the speed of the engine is lower than the prescribed value.

16. The motorcycle according to claim 13, wherein the variable valve device further comprises:

a deceleration determiner arranged to determine whether or not a deceleration of the speed of the engine is smaller than a prescribed value; and a deceleration relaxer arranged to reduce the displacement to be reduced by the displacement reducer if the deceleration determiner determines that the deceleration is greater than the prescribed value.

* * * * *